United States Patent
Prasad et al.

(10) Patent No.: US 8,152,898 B2
(45) Date of Patent: Apr. 10, 2012

(54) HELIUM RECOVERY PROCESS

(75) Inventors: Ravi Prasad, East Amherst, NY (US); Carl Joseph Heim, Amherst, NY (US); James Joseph Maloney, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 329 days.

(21) Appl. No.: 12/571,934

(22) Filed: Oct. 1, 2009

(65) Prior Publication Data

US 2010/0101410 A1    Apr. 29, 2010

Related U.S. Application Data

(60) Provisional application No. 61/108,095, filed on Oct. 24, 2008.

(51) Int. Cl.
*B01D 53/22* (2006.01)
(52) U.S. Cl. ............... 95/53; 95/45; 95/55; 95/90; 96/4
(58) Field of Classification Search ............... 95/45, 53, 95/55, 90; 96/4
See application file for complete search history.

(56) References Cited

U.S. PATENT DOCUMENTS

| | | | |
|---|---|---|---|
| 2,540,152 A * | 2/1951 | Weller | 95/53 |
| 3,807,185 A | 4/1974 | Forg et al. | |
| 4,238,204 A | 12/1980 | Perry | |
| 4,360,505 A | 11/1982 | Sheridan, II et al. | |
| 4,398,926 A | 8/1983 | Doshi | |
| 4,425,318 A | 1/1984 | Maeland et al. | |
| 4,793,829 A * | 12/1988 | Pan et al. | 95/47 |
| 4,934,148 A | 6/1990 | Prasad et al. | |
| 5,064,446 A * | 11/1991 | Kusuki et al. | 95/53 |
| 5,080,694 A | 1/1992 | Knoblauch et al. | |
| 5,185,014 A | 2/1993 | Prasad | |
| 5,329,775 A | 7/1994 | Fiedler et al. | |
| 5,542,966 A | 8/1996 | D'Amico et al. | |
| 5,632,803 A | 5/1997 | Stoner et al. | |
| 5,771,714 A | 6/1998 | Emley et al. | |
| 5,928,415 A * | 7/1999 | Girard et al. | 96/4 |
| 6,179,900 B1 | 1/2001 | Behling et al. | |
| 6,669,922 B1 * | 12/2003 | Fuentes | 423/648.1 |
| 7,294,172 B2 * | 11/2007 | Baksh et al. | 95/53 |
| 2005/0217479 A1 | 10/2005 | Hale et al. | |

FOREIGN PATENT DOCUMENTS

FR     2758475 B1     7/1998
WO    WO03/011434    2/2003

OTHER PUBLICATIONS

Bowe et al. "Helium Recovery and Recycling Makes Good Business Sense." Industrial Gases/Combustion. Sep. 2004. pp. 79-81.

* cited by examiner

*Primary Examiner* — Jason M Greene
*Assistant Examiner* — Anthony Shumate
(74) *Attorney, Agent, or Firm* — Salvatore P. Pace

(57) ABSTRACT

Helium is recovered from gas streams containing high concentrations of hydrogen gas and low concentrations of helium gas, such as from the recycle stream from the production of ammonia. The inventive process provides for an integrated process for the recovery of both an enriched helium gas stream product and a high purity hydrogen gas stream product.

20 Claims, 1 Drawing Sheet

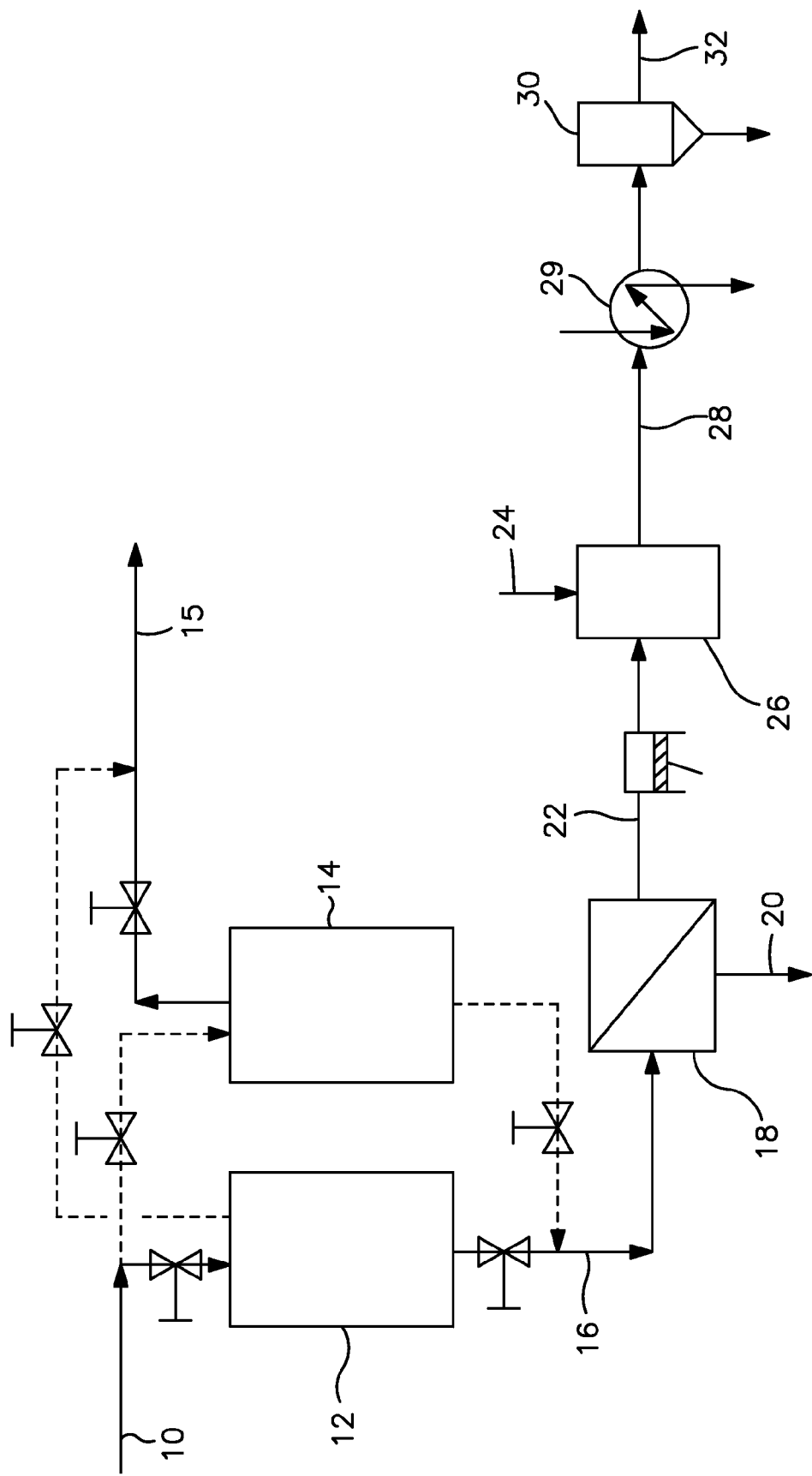

HELIUM RECOVERY PROCESS

RELATED APPLICATIONS

This application claims the benefit of U.S. Provisional Application Ser. No. 61/108,095, filed on Oct. 24, 2008, which is incorporated herein by reference.

BACKGROUND OF THE INVENTION

1. Field of the Invention

The present invention relates to a process for the recovery of helium from gas streams containing high concentrations of hydrogen and low concentrations of helium. More particularly, it relates to the recovery of helium and hydrogen from feed gas streams containing high concentrations of hydrogen and low concentrations of helium by first removing a hydrogen rich gas stream to form a hydrogen depleted feed stream and then recovering a helium rich gas stream from the hydrogen depleted feed stream. The hydrogen rich gas stream can be recycled or recovered and the helium rich stream can be further refined to produce high purity helium gas.

2. Background of the Invention

Helium is a rare gas. It has unique physical properties making it valuable in a wide range of commercial applications. For example, helium is inert, it's boiling and melting points are the lowest among the elements, it is the second lightest element, and it only Exists as a gas in all but the most cryogenic conditions. Commercial applications range from balloons to lasers and include heat transfer and cooling applications; shielding applications; gas tracing applications; inert environments for growing crystals; and numerous other applications. However, due to its limited availability and increasing commercial demand, its costs have increased significantly over that the last few years.

While helium is the second most abundant element in the universe, it is extremely rare on Earth. In fact, it is a finite resource and is primarily found trapped with natural gas in concentrations up to about seven percent by volume although most often, it is found in concentrations of less than 0.5% by volume. Almost all of the commercial helium requirements are supplied by the extraction from helium-containing natural gas by low temperature fractional distillation processes. The resulting helium rich gases are further purified or refined using additional cryogenic distillation steps or by pressure swing adsorption (PSA) processes which selectively remove other gases. These final refining steps result in commercial grades of helium in excess of 99.9%.

The high cost and limited availability of helium gas has resulted in investigations to identify other sources of helium. The source most relevant to the present invention is hydrogen containing gas streams produced from or existing in various current commercial processes. Process gas streams such as those from the production of hydrogen, or which recycle hydrogen, can contain helium in concentrations which can be economically extracted and recovered. For example, processes for the production of synthesis gas (CO/$H_2$), which is typically further used in hydrogen production, ammonia production or used in certain Fischer-Tropsch reactions, typically begin with natural gas feed streams. The various processing and recycling steps do not normally separate the inert helium already present from the natural gas feed stream and it often accumulates in the processing steps. The resulting recycle and purge gas can contain helium in concentrations of up to 2% or more by volume.

Of particular interest for the present inventive process is the use of a process gas stream that is vented or recycled during the production of ammonia. Ammonia is produced commercially in vast quantities with worldwide production estimated to be nearly 150 Metric Tonnes per year. The most common method of production is the Haber process in which nitrogen is combined directly with hydrogen at high temperatures and pressures in the presence of a catalyst. The hydrogen used in the process is typically produced from natural gas, as discussed above, and the reacted gas stream containing predominantly hydrogen, methane and nitrogen and smaller amounts of argon, helium and traces of other gases is typically recycled to the reaction chamber. The concentration of the various species, particularly methane and argon, will depend on the location in the loop from where the gas stream for helium recovery is tapped. Helium, as well as other inert gases, accumulates in the recycle gas stream and this accumulated concentration of helium makes the recycle gas stream a useful feed stream for helium recovery. Further, to prevent build-up of inert gases in the recycle loop in a typical ammonia production process, a purge is established which is rich in hydrogen and can have helium in concentrations worth recovering. This gas stream containing predominantly hydrogen and nitrogen and containing up to 10% helium is a particularly useful feed for the present process.

Thus, the present invention recovers helium from gas streams containing high concentrations of hydrogen and low concentrations of helium, separates and recovers a high purity hydrogen stream for further processing or for another use, and subsequently recovers a helium rich gas stream that can be further processed using conventional helium refining techniques. Unlike conventional processes, this process advantageously recovers two economically valuable gas streams; one being a helium enriched gas stream and the other being a high purity hydrogen gas stream.

Processes using multi-step cryogenic distillation or hybrid PSA systems for removing or extracting helium from natural gas or other gases containing low concentrations of helium are known. These processes are typically directed to natural gas feed streams and require significant capital investments and complex and expensive cryogenic distillation systems to generate the enriched helium gas streams which can be further processed or integrated into the starting extraction process. Similarly, related processes for the recovery of hydrogen from refinery off gases have been taught.

In U.S. Pat. No. 3,807,185, helium containing vent gas from the synthesis of ammonia is subjected to several partial condensation steps and then cooled to remove the higher-boiling components, namely, methane, nitrogen, and argon in a phase separator. A low temperature stripping column is then employed to recover liquid hydrogen and a gaseous helium/hydrogen mixture. Hydrogen and argon can also be recovered. This process requires multiple cooling and heating steps and, the hydrogen feed stream must be condensed at extremely low temperatures requiring high capital equipment costs and high power requirements.

U.S. Pat. No. 5,632,803 discloses a process in which a membrane separation is followed by two stages of PSA processing used in series to recover helium from source streams containing 0.5% to 5% by volume helium in concentrations of greater than 98% by volume. This process is directed to recovering helium from a gas stream containing primarily hydrocarbons and some nitrogen and is not economically desirable for separating helium from a feed stream containing mostly hydrogen because the PSA adsorbents typically have low capacities for both hydrogen and helium and have poor selectivity for hydrogen over helium.

U.S. Pat. No. 6,179,900 discloses a process wherein the feed gas contains a desired component in low concentrations, preferably hydrogen from FCC gases. The feed gas is first passed through a membrane separation stage to produce a permeate gas enriched in the desired component. The high pressure retentate gas is used to compress the low pressure permeate gas which is then fed to a PSA to purify the desired component.

U.S. Pat. No. 4,360,505 discloses an adiabatic process for recovering hydrogen from mixed gas streams using hydridable materials as the absorbing medium. The process comprises utilizing a composite of a thermal ballast in admixture with the hydride material to absorb the heat of reaction and to aid in desorption.

U.S. Pat. No. 5,771,714 discloses a process for the production of helium from a feed gas comprising helium, nitrogen, and hydrocarbons in a system comprising a high pressure and a low pressure cryogenic rectification column.

None of these processes contemplate using a feed gas stream having a high concentration of hydrogen, such as above 50% by volume, removing a higher purity hydrogen stream and then separating helium from the hydrogen depleted gas stream to obtain a helium rich product gas stream in the absence of either a cryogenic distillation or a PSA step. The present process provides for a unique, ambient temperature process for recovering both a helium rich product stream and a high purity hydrogen product stream in an integrated process and in a cost effective manner. Prior processes that recover only one of these gases and do not effectively separate hydrogen from helium do not take advantage of the low cost integration and incur significant economic penalty.

Thus one objective of the present process is to recover a helium enriched gas stream from a feed gas stream containing a hydrogen concentration in excess of 50% by volume and helium concentration less than 10% by volume which is further processed to produce a helium rich gas stream at concentrations of helium of greater than 25% by volume while at the same time recovering a higher purity hydrogen gas stream at concentrations of hydrogen of greater than 90% by volume.

SUMMARY OF THE INVENTION

The present invention is directed to a process for the recovery of a helium rich gas stream and a high purity hydrogen gas stream from a feed gas stream containing high concentrations of hydrogen, low concentrations of helium and other gases components by directing the feed gas stream through a hydrogen separating material under conditions that selectively separates hydrogen gas from the other gas components into a high purity hydrogen gas stream and a hydrogen depleted gas stream containing helium, collecting high purity hydrogen gas stream, directing the hydrogen depleted gas stream through a helium permeable membrane separator under conditions that selectively permits helium gas to permeate the membrane and form a helium rich permeate gas stream, and collecting the helium rich permeate gas stream. The helium concentration of the helium rich permeate gas stream will be greater than 25%, more preferably greater than 50% and most preferably greater than 75% by volume and the concentration of hydrogen in the high purity hydrogen gas stream will be in greater than 90%, more preferably greater than 95% and most preferably greater than 99% by volume to enhance the economic viability of the overall helium recovery process. As understood by one skilled in the art, the high purity hydrogen gas stream will have a concentration of hydrogen gas that is significantly greater than that of the feed gas stream. The helium rich permeate gas stream can be commercially used or be further refined into a high purity helium gas product as desired.

In an optional embodiment of the present invention, the helium rich permeate gas can be passed through a combustion process for the removal of any residual hydrogen and other combustibles prior to producing a final hydrogen depleted, helium rich product gas stream.

In another embodiment of this invention, the helium concentration in the hydrogen-containing feed gas stream is increased by first passing the feed gas stream through membrane system designed to increase the concentration of helium gas in the feed gas and then feeding the partially enriched helium gas stream to the hydrogen separating material. In practice, this can be accomplished by using either a helium selective membrane system and then sending the helium permeate gas to the hydrogen separating material or by using a hydrogen selective membrane system and sending the partially enriched helium retentate gas to the hydrogen separating material.

In a preferred embodiment of the inventive process, the feed gas stream is a gas stream will be the hydrogen recycle stream from the production of ammonia containing predominantly hydrogen, nitrogen and low concentrations of helium and argon. The feed gas may also contain methane if the recycle feed stream is taken before the hydrogen recovery unit, typically a cryogenic operation. The hydrogen present in this feed gas stream will be in concentrations of greater than 70% by volume.

BRIEF DESCRIPTION OF THE DRAWINGS

FIG. 1 is a schematic diagram of the one embodiment of the present invention wherein a helium rich gas stream is recovered from a high pressure feed gas stream containing a high concentration of hydrogen and a low concentration of helium by passing the feed gas stream through a hydride bed to capture the hydrogen gas, passing the exiting gas stream through a membrane to selectively permeate helium gas and then collecting the concentrated helium gas stream. The hydrogen gas that is taken up by the hydride bed is also recovered to form a high purity hydrogen gas stream. In an optional step, the helium rich permeate gas stream is combusted with oxygen to remove any residual hydrogen and other combustibles from the helium product gas stream.

DETAILED DESCRIPTION OF THE INVENTION

FIG. 1 is an illustration of one mode of practicing the present invention which recovers helium and hydrogen from a hydrogen-containing feed gas stream containing low concentrations of helium, such as less than 10% and more typically less than 5% by volume. Feed gas stream 10 contains a high concentration of hydrogen gas, such as greater than 50%, preferably greater than 70%, and most preferably at least 90% by volume. All concentrations of gases in the various gas streams as described herein will be in volume percentages.

The feed gas stream 10 containing high concentrations of hydrogen gas, also referred to herein as the hydrogen-containing feed gas, is passed through at least one bed (two beds are illustrated as 12 and 14) of a hydrogen separating material wherein a substantial amount of hydrogen is removed from the feed gas stream. Greater than 50%, preferably greater than 70%, and more preferably, greater than 90% by volume of the available hydrogen will be removed from the feed gas stream 10. A hydride material, as discussed in this embodiment, is the hydrogen separation material and selectively takes up hydrogen and does not take up significant amounts of helium or other gases present such as nitrogen, methane or other higher hydrocarbons. The hydride material is selected to remove hydrogen under the process conditions employed, generally at elevated pressures and near ambient temperatures as described below. As illustrated in FIG. 1, hydride beds 12 and 14 comprise a two bed system with bed 12 and bed 14 each containing the hydride material and, although not illustrated, each of the beds may in practice be comprised of one or more beds or vessels used in parallel. Preferably, beds 12 and 14 operate in a cyclical manner and when one of the beds is in the hydrogen uptake mode, the other is being regenerated to release hydrogen gas. For example, bed 12 would operate in hydrogen uptake mode for less than 60 minutes, preferably less than 30 minutes. During the same time, bed 14 would be in regeneration mode producing high purity hydrogen for the same time period.

The hydrogen gas is collected from the beds in regeneration and generally results in a high purity hydrogen gas stream having concentrations of hydrogen in excess of 90%, preferably 95% and more preferably 99% by volume. The hydrogen-containing feed gas stream 10 is introduced to the hydride beds at pressures exceeding about 100 psig, more preferably exceeding about 250 psig and most preferably exceeding about 500 psig and at temperatures below 100° C., preferably below 50° C. and more preferably near ambient temperatures. Ambient temperatures are typically about 20° C. The process conditions can be selected by one skilled in the art to optimize the process depending on the conditions of the hydrogen-containing feed gas stream and the hydrogen separating system. For example, if the hydrogen-containing feed gas stream 10 is received from an ammonia production process, the feed gas conditions depend on the location in the ammonia process from where the stream is extracted. If taken from the ammonia synthesis loop recycle stream, its pressure will typically exceed 800 psig. Regeneration of the bed will preferably be carried out in the 5 to 100 psig range and at temperatures below 100° C.; more preferably at temperatures below 50° C.

In the preferred operation of this invention, the hydrogen-containing feed gas stream 10 is received from another manufacturing process wherein such stream will contain concentrations of hydrogen in excess of 50% by volume. This can be a hydrogen-containing vent gas stream or a recycle gas stream from another chemical manufacturing or refining process. For example, in a hydrogen production process, such as a steam reforming or partial oxidation process using a natural gas feed gas stream, the product hydrogen gas stream can be used as the hydrogen-containing feed gas used in the present process. More preferably, the hydrogen-containing feed gas is the product gas stream from an ammonia production process after the ammonia is stripped away leaving a gas stream containing predominantly hydrogen, methane and nitrogen gas, small amounts of argon and typically up to about 5% helium by volume depending on the helium concentration in the natural gas fed to the plant and the purge rate from the synthesis loop. In the most preferred embodiment, the feed gas stream is hydrogen rich gas stream which has been separated from methane and the other gases found in the ammonia-stripped product gas stream and intended to be recycled into the ammonia production process. In this preferred embodiment, the hydrogen product gas stream 15 recovered in the present process can be recycled back to the ammonia production process or recovered for other processing.

As used herein, the term low concentrations of helium is intended to mean gas streams containing less than 10% by volume of helium and more typically, contain less than 5% by volume of helium. Although any concentration of helium can, in principle, be used in the present process, the economics of the helium recovery will become less attractive as the helium concentration in the feed gas stream drops below about 0.5%. Preferably the gas streams selected for use as the hydrogen-containing feed gas 10 of the present process will have helium present in amounts from 1% to 10%, and more preferably from 2% to 5% of helium by volume.

A hydrogen-containing feed gas stream comprised of at least 90% hydrogen and between 2% and 5% by volume helium is most preferred for this process with the remaining components of the feed gas stream being nitrogen and other gases typically found in the hydrogen-containing feed gas stream such as argon and hydrocarbons. Preferably, the hydrogen-containing feed gas stream will contain no more than 20% of nitrogen and less than 5% hydrocarbons. If the concentrations of oxygen, carbon monoxide, carbon dioxide or water vapor are in excess of 100 ppm, it may be necessary to remove them using conventional technologies such as adsorption, chemisorption or scrubbing as are known in the art. Additionally, it will be important to limit concentrations of sulfur oxides and nitrogen oxides to below about 50 ppm.

The helium concentration in the hydrogen depleted gas stream exiting the hydride bed will depend on the feed composition, the hydrogen uptake and release characteristics of the hydrogen separating material and the process conditions used.

The hydrogen separating material used in the present process can be selected from the group consisting of hydride materials, liquid hydrogen absorbers, and hydrogen selective membranes. Preferred are the hydride materials.

The hydride materials can be selected from any of the known hydrides that are capable of bonding with or adsorbing hydrogen and can be subsequently regenerated to release the stored hydrogen gas. Several transition metals, such as magnesium, form metallic hydrides under suitable conditions. These compounds generally have physical and chemical properties which closely resemble the parent metal but are less dense and therefore able to adsorb hydrogen. More typically, the hydride materials are multi-component metal alloys which can reversibly uptake and release hydrogen. Such materials are known to have adequate capacity to take up bonded hydrogen gas at high partial pressures and then can release the hydrogen gas at a lower partial pressure and/or higher temperatures. The hydrogen gas is reversibly absorbed in these materials and is believed to occupy interstitial positions in the metal lattice.

Among the many hydride materials suitable for the present process, two groups have been studied to date that are particularly suitable. These materials are metallic alloys and are generally represented by the formulae $AB_5$ and $AB_2$ wherein A is selected from a rare earth metal and B is selected from elements in group IVA of the Periodic Table, such as manganese, nickel, chromium, and vanadium. These alloys, have a particularly commercially advantageous combination of high hydrogen storage capacities (as high as 1.4 to 1.6% by weight) and commercially advantageous operating ranges for pressure and temperature. Such materials are commercially available.

Particularly useful $AB_5$ alloys combine a hydride forming metal A, a rare earth metal of lanthanum, cerium, neodymium, praseodymium, yttrium or their mixture known as Mischmetal, with a non-hydride forming element such as nickel. The nickel can be doped with other metals, such as cobalt, tin, or aluminum to improve the material's stability or to adjust equilibrium hydrogen pressure and temperature required for its hydrogen uptake or release.

Particularly useful $AB_2$ alloys, also known as Laves phases, represent a large group of alloys containing titanium, zirconium or hafnium at the A-site and a transition metal(s) at a B-site such as manganese, nickel, chromium, vanadium, and others. Reversible hydrogen storage capacities of this group of materials are comparable with those of $AB_5$-type alloys although $AB_2$ alloys are capable of storing additional amounts of hydrogen at high hydrogen pressures.

As known to one skilled in the art, hydride materials may be degraded or otherwise limited in their effectiveness by the presence of certain contaminant gas species. Chief among these potential contaminates are oxygen-containing species such as water, carbon monoxide, carbon dioxide and molecular oxygen which generally react "irreversibly" with the material and can diminish its capacity to adsorb hydrogen gas. If such contaminant gases are present in the hydrogen-containing feed gas stream, it is preferred to remove them before contacting the feed gas stream with the hydride bed. Known methods of removing these oxygen-containing species include adsorption, absorption and chemical reaction.

It is also possible to use liquid hydrogen absorbers as the hydrogen separating materials to remove the hydrogen from the hydrogen-containing feed gas stream. It is preferred that these materials have enthalpies of hydrogen uptake ($-\Delta H$) of about 11 kcal/mole of hydrogen. Substantially lower enthalpies will result in weaker bonding and lower selectivity while much higher enthalpies will make the process difficult to reverse to remove the captured hydrogen. Examples of these materials include organic compounds such as trans-decalin, methylcyclohexane and N-ethylcarbazole. Use of these types of materials would typically entail the use of a hydrogen "absorption" column and a "desorption" column. The column would replace the beds 12 and 14, respectively, and operate in a similar cyclic nature with one column adsorbing hydrogen while the second column desorbing hydrogen. The specific temperatures and pressures are material dependent, but, like the hydrides described above, hydrogen uptake is favored by higher pressures and lower temperatures while desorption occurs at lower pressures and may be aided by higher temperatures. For example, N-ethylcarbazole can uptake hydrogen at about 150° C. and about 1000 psig in the presence of a ruthenium catalyst and release hydrogen at about 200° C. and about 0 psig in the presence of a palladium catalyst. An advantage of these materials is that, they have low vapor pressure and exist in a liquid state during operation allowing for simple processing. For example, they can be easily pumped and piped using conventional apparatus and systems. These materials can also have hydrogen separating capacities as high as 5% by weight leading to compact systems with lower capital costs. Additionally, these materials can be scaled-up to the appropriate or optimal size using traditional chemical engineering equipment allowing simple scale-up to large size applications.

In yet another embodiment of this invention, hydrogen selective membrane systems can be used as the hydrogen separating materials and the beds can be replaced with a single membrane system or each bed can be replaced. Various hydrogen selective membranes can be employed as the hydrogen separating material provided the membrane has a high selectivity for hydrogen over other gas species in the feed gas stream. Suitable membranes are typically made of metals or metal alloys supported on porous substrates. Examples of such metal membranes include those made of palladium, and alloys such as palladium-gold, vanadium-copper, vanadium-nickel-copper, iron-aluminum-chromium, and others. These hydrogen selective metal membranes typically operate at temperatures ranging from about 300° to about 500° C., although improvements in material compositions are lowering the operating temperatures and the newest membranes can operate at temperatures below 300° C.

When such membranes are used, the retentate gas stream is the hydrogen depleted and helium enriched gas stream (16 while the permeate gas stream is the high purity hydrogen product gas stream (15). A potential advantage of using these membranes is that they operate in a continuous manner thus eliminating the need for a cyclical operation proposed with the use of the other hydrogen separating materials. Another advantage is that these membranes are not as sensitive to degradation from oxygen-containing gas species, although they are often sensitive to specific contaminants such as sulfur or carbon monoxide. However, given their requirement for elevated temperature operation, heat recovery is likely to become an important consideration with their use and efficient heat energy recovery may require additional heat transfer conduit systems.

Referring again to FIG. 1, the embodiment using the preferred hydride separating material is again described although one skilled in the art will understand how to substitute the liquid hydrogen absorbers or hydrogen selective membrane system in the hydrogen separating step to produce a high purity hydrogen stream and a hydrogen depleted stream enriched in helium. Further, as will be understood, the energy requirements of the exothermic and endothermic reactions as described below are generally not applicable to the membrane systems.

The hydrogen-containing feed gas stream 10 flows through beds 12 and 14 and the hydrogen gas is taken up by the hydrogen separating material yielding an hydrogen depleted gas stream 16 that exits the beds 12 or 14 substantially depleted of hydrogen gas. The hydrogen gas contained in the hydrogen depleted gas stream 16 will be significantly reduced and will contain high concentrations of helium and other non-hydrogen gas species present in feed stream 10. The hydrogen uptake by the hydride materials is typically exothermic and it is preferred to remove heat energy from the bed during the uptake process which can be captured or used in the endothermic hydride materials regeneration process described below. Although not shown, this can be accomplished in a number of ways including the use of internal heat transfer passages with flowing fluid streams, external heat transfer conduits between the beds or through other energy capture systems.

Bed 14 containing the collected hydrogen gas is regenerated in the other half of the cyclic process to release the hydrogen gas and the recovered hydrogen product gas stream 15 contains relatively pure hydrogen gas. Although the feed gas stream 10 will already have high concentrations of hydrogen gas, the hydrogen gas concentration in the hydrogen product gas stream 15 will be in higher concentrations than found in feed gas 10. The regeneration process is typically carried out at lower pressures, typically about 5 to about 50 psig. Lower regeneration pressure enables a greater fraction of the hydrogen to be recovered from the bed, but higher pressures are more useful for further use of the byproduct hydrogen gas stream. The regeneration temperatures are generally from below ambient to 100° C. above ambient, more preferably from ambient to 50° C. above ambient and most preferably from ambient to 10° C. above ambient. The process is preferably conducted in a cyclic manor with bed 12 capturing hydrogen gas while bed 14 is releasing hydrogen gas. The conditions of regeneration and recovery of hydrogen gas will depend on the material selected, the composition and pressure of the feed gas stream and the pressure at which the hydrogen gas is to be recovered. In typical ammonia processes, the recycle of feed gas will be received at pressures of greater than 800 psig and temperatures close to ambient. In such cases, it is generally preferred to conduct the regeneration and hydrogen removal step at temperatures of 50° C. above ambient. Preferably, bed 12 capturing the hydrogen gas operates at a pressure that is equal to the pressure of feed gas stream 10 minus the pressure drop needed to overcome the associated flow resistance and bed 14, releasing the hydrogen gas, will operate at a pressure in the range of near ambient pressure to 50 psig, but can be higher if the hydrogen release is carried out at higher temperature (e.g. 100° C.) or only a smaller portion of the loading capacity of the hydride is used in the cyclic process. One skilled in the art will readily be able to optimize the process for the given conditions.

The hydrogen release by these hydride materials occurs during an endothermic reaction and heat energy will be needed to be added to bed 14 during this step. As described earlier, this can be accomplished in a number of conventional ways including the use of internal heat transfer passages with flowing fluid streams, external heat transfer conduits from the vessel, etc. from the exothermic hydrogen adsorption reaction in bed 12. Operating the beds at higher temperatures will aid in more rapid release of hydrogen and the process can be optimized to reduce the net energy requirements.

An advantage of the present process is that in first removing hydrogen, the flow rate of the hydrogen depleted gas stream 16 exiting bed 12 or 14 is much lower than that of the flow rate of the hydrogen-containing feed gas stream 10 resulting in much smaller membrane and combustion systems as well as minimizing the use of oxygen in the combustor, if employed. For example, if the hydrogen concentration in the hydrogen-containing feed gas stream 10 is 90% by volume, then the quantity of hydrogen in the hydrogen depleted gas stream 16 entering the membrane system would be reduced by a factor of 5 to 10. At the same time, the hydrogen depleted gas stream 16 is typically still at a higher pressure, typically only 10 to 100 psig below the feed, and is significantly enriched in helium and other non-hydrogen species to enable the downstream helium enrichment steps to be more efficient and cost effective as is more fully explained below.

Hydrogen depleted gas stream 16 is next passed through a helium permeable membrane separator 20 which is selective to helium over nitrogen and other heavier gas species to produce a helium rich permeate gas stream 22. Many different membranes can be employed such as polymeric membranes and microporous sieving membranes. However, polymeric membranes are ideally suited for the present application because of their permselective properties, which lead to compact, power efficient processes. In addition, these membrane systems have long life and are robust with respect to operational complexities. Polymers such as polyimides, polyesters, polycarbonates, polysulfone, cellulose acetate and others exhibit high helium permeability and excellent selectivity for helium over other common gases that may be left in the helium enriched gas stream such as nitrogen, methane and argon. In addition, polymeric membranes can be packaged into modules with high area packing densities (compact systems) and capable of high pressure operation with high reliability. The preferred membranes will exhibit helium/nitrogen selectivities of greater than 8, more preferably of greater than 15 and most preferably of greater than 30 at the operating temperatures employed, typically from 20° to 50° C. In practice, the membranes exhibit a tradeoff between selectivity and flux and the final selection is governed by optimization of the specific process economics.

In FIG. 1, the helium rich permeate gas stream 22 may also contain residual amounts of hydrogen gas that was not adsorbed in bed 12. Most of the nitrogen gas contained in the hydrogen depleted gas stream 16 is rejected in the retentate gas stream 20 and is typically vented. Higher helium purities can be achieved via a multi-stage cascade membrane process or by recycling a portion of the helium rich permeate gas stream 22 and blending with the helium rich gas stream feed 16 that exits bed 12 (not shown). The helium rich permeate gas stream 22 will contain in excess of 25% by volume, more preferably 50% by volume and most preferably 75% by volume helium and will be collected for further processing in a conventional helium refinery process or further processed to remove any residual amounts of hydrogen as described below.

FIG. 1 also contains an optional step in which the helium rich permeate gas stream 22 is passed into a combustion reactor 26. In this embodiment, it is desired to remove any small or residual amounts of hydrogen gas and other combustible gases remaining in the helium rich permeate gas stream 22 due to process requirements of the down stream helium purification or refining process (not shown). This removal of residual amounts of hydrogen gas is accomplished by converting the residual hydrogen and other combustible gases by burning it with oxygen in a conventional reactor 26 such as a gas phase combustor or catalytic converter. An oxygen-containing feed gas 24 is injected into the reactor 26. In this combustion process, the amount of oxygen used should be equal to or slightly above the stoichiometric level to react all the residual hydrogen. The final helium enriched product gas stream 28 is then cooled, the condensed water removed and the remaining hydrogen-free, gas recovered for further processing.

The cooling and condensate water removal from product gas stream 28 is optionally accomplished by a condenser system using conventional technology. This could include air cooled systems, chilled water cooled systems, direct contact after-coolers and closed loop refrigerated cooling systems (shown as 29). As the gas stream is cooled, water will condense in liquid form and is removed using conventional equipment such as coalescing filters, cyclones and demisters (30). Depending on the needs of downstream helium processing, it may be desirable to have additional drying of gas stream 32 using technologies such as adsorption dryers or chiller-dryer systems (not shown).

Another optional embodiment of the present invention can be advantageously used when the hydrogen feed gas stream 10 contains lower concentration of helium gas, such as below about 0.5% by volume. According to this embodiment (not shown), the feed gas is first sent through an enriching process, preferably a helium selective membrane, prior to sending the helium enriched permeate gas to the hydrogen separating materials. The helium enriching process will increase the helium concentration by at least a factor of 1.5 and more preferably by a factor of 2 or more resulting in a gas stream entering the hydrogen separation material with a concentration of at least 1.0% helium by volume. The membrane enriching step serves to reduce the size and cost of the equipment and materials used in the hydrogen separating step to follow. One drawback of this process is the added compression of the permeate gas stream which would entail the addition of compressors as well as additional power requirements.

EXAMPLE

The present example is a computer simulation and is provided to illustrate the embodiment as shown in FIG. 1 to produce a helium enriched permeate gas stream from a feed gas comprised of 90% hydrogen, 7% nitrogen and 3% helium representing a gas stream feed mixture as found in a typical hydrogen recycle gas stream from an ammonia production process. In this example, a high purity hydrogen stream is recovered for further processing. The flow rates, pressures and compositions of the various streams illustrated in FIG. 1 are shown below in Table 1.

TABLE 1

|  | Stream 10 | Stream 16 | Stream 20 | Stream 22 | Stream 24 | Stream 28 | Stream 32 | Stream 7 |
|---|---|---|---|---|---|---|---|---|
| Flowrate (ncfh) | 1000 | 103 | 68 | 35 | 0.9 | 35 | 33 | 897 |
| Pressure (atm abs) | 65.0 | 62.0 | 62.0 | 6.5 | 7.5 | 6.5 | 6.0 | 1.5 |
| H2 | 90% | 3% | 2% | 5% | 0% | 0% | 0% | 100% |
| He | 3% | 29% | 4% | 78% | 0% | 78% | 82% | 0% |
| N2 | 7% | 68% | 94% | 17% | 0% | 17% | 18% | 0% |
| H2O | 0% | 0% | 0% | 0% | 0% | 5% | Saturated | 0% |
| O2 | 0% | 0% | 0% | 0% | 100% | 0% | 0% | 0% |

The hydrogen-containing feed gas stream enters a metal hydride bed at the flow rates and pressures shown in Table 1 and at a temperature of 25° C. Hydrogen gas is absorbed by the hydride bed comprised of an $AB_5$ type of material. The hydrogen depleted gas stream 16 exiting bed 12 or 14 is substantially depleted of hydrogen and is comprised primarily of helium, at about 29% by volume, and nitrogen with a small amount of hydrogen. This hydrogen depleted gas stream 16 enters a helium permeable membrane separator at a pressure of 62 bar, and at a flow rate of 103 cfh. The resulting helium rich permeate gas stream 22 exiting the helium permeable membrane separator membrane 18 at a flow rate of 35 cfh and a pressure of 6.5 bar is now enriched to about 78% by volume helium. Approximately 91% by volume of the nitrogen originally contained in the helium rich gas stream 22 that passed into the membrane separator 18 is removed in the retentate gas stream 20. The helium rich permeate gas stream 22 exiting the membrane has about 78% helium and 5% hydrogen and is at a purity level that is adequate to be further processed as desired.

Since helium/hydrogen gas separation is difficult with most conventional technologies, and since the presence of hydrogen in helium rich permeate gas stream 22 is usually undesirable, any residual hydrogen can be further reduced or eliminated. In this optional step as illustrated in FIG. 1, the residual hydrogen gas and other combustible gases left in the helium rich permeate gas stream 22 are removed by combusting the helium rich permeate gas stream 22 with oxygen introduced into reactor 26 which enters through oxygen gas stream 24. The reactor 26 is a conventional gas phase burner or a catalytic converter as known in the art. The use of a catalytic converter as the reactor is preferred for the removal of hydrogen concentrations of less than about 5%. Note that due to the low flow rate of the helium rich permeate gas stream 22 and its relatively low hydrogen concentration, the oxygen requirement will be modest and it may be advantageous to use pure oxygen. Water formed during the reaction may be removed by conventional cooling technology such as a refrigerated cooling system 29 which cools the product gas stream prior to passing through a condenser system 30 to separate out condensed water. The resulting enriched helium product gas stream 32 containing helium at a concentration of 82% by volume is now substantially free of hydrogen. The remaining 18% is nitrogen in the enriched helium product gas stream 32 and can be readily removed by downstream purification processes such as PSA or cryogenic processing if desired.

As desired, the helium rich permeate gas stream 22 or the hydrogen depleted helium product gas stream 28 can be passed through a helium refinery comprised of PSA and cryogenic process steps, as currently used in the helium industry, to produce high purity helium product.

It should be apparent to those skilled in the art that the subject invention is not limited by the examples provided herein which have been provided to merely demonstrate the operability of the present invention. The selection of hydrogen separating materials, feed gases and process conditions can be determined from the specification without departing from the sprit of the invention as herein disclosed and described. The scope of this invention includes equivalent embodiments, modifications, and variations that fall within the scope of the attached claims.

What is claimed is:

1. An integrated process for the recovery of a helium rich gas stream and a high purity hydrogen gas stream from a feed gas stream containing high concentrations of hydrogen, low concentrations of helium and other gas components comprising:
    (a) directing said feed gas stream through a hydrogen separating material under conditions that selectively separate hydrogen gas from the other gas components into a high purity hydrogen gas stream and a hydrogen depleted gas stream containing helium,
    (b) collecting said high purity hydrogen gas stream,
    (c) directing said hydrogen depleted gas stream through a helium permeable membrane separator under conditions that selectively permit helium gas to permeate the membrane and forms a helium rich permeate gas stream, and
    (d) collecting said helium rich permeate gas stream.

2. The process of claim 1 wherein said concentration of hydrogen in said feed gas stream is greater than 50% by volume.

3. The process of claim 1 wherein said feed gas stream is a recycle gas stream from the production of ammonia containing predominantly hydrogen, methane and nitrogen with small amounts of argon and helium.

4. The process of claim 1 wherein said hydrogen separating material is selected from the group consisting of hydride materials, hydrogen selective membranes and liquid hydrogen absorbers.

5. The process of claim 4 wherein said hydrogen separating material is a metallic hydride.

6. The process of claim 4 wherein the hydrogen separating material is a hydrogen selective metal membrane.

7. The process of claim 1 wherein said helium rich permeate gas stream is sent to a combustion reactor and reacted with oxygen to remove residual hydrogen gas.

8. The process of claim 1 wherein the flow rate of said hydrogen depleted gas stream is lower than the flow rate of said feed gas stream.

9. The process of claim 1 wherein said feed gas stream is first sent through a helium enriching process comprising steps of passing said feed gas stream through a helium selective membrane to obtain a helium enriched permeate gas having at least 1.0% helium by volume prior to separating the hydrogen gas.

10. A process for recovering an enriched helium gas stream from a feed gas stream containing at least 90% hydrogen by volume and between 2% and 5% by volume of helium, said process comprising the steps of:
- (a) directing said feed gas stream through a hydrogen separating material under conditions that selectively removes hydrogen gas from the other gas components to obtain a high purity hydrogen gas stream and a hydrogen depleted gas stream containing helium,
- (b) collecting said high purity hydrogen gas stream,
- (c) directing said hydrogen depleted gas stream through a helium permeable membrane separator under conditions that selectively permit helium gas to permeate the membrane and form a helium rich permeate gas stream, and
- (d) collecting said helium rich permeate gas stream having greater than 25% by volume helium.

11. The process of claim 10 wherein said feed gas stream is introduced into said hydrogen separating material at pressures of about 100 to about 1000 psig and temperatures from about 10° to about 50° C.

12. The process of claim 10 wherein the hydrogen separating material is a metal alloy hydride.

13. The process of claim 10 wherein the hydrogen separating material is a hydrogen selective metal membrane.

14. The process of claim 10 wherein said feed gas stream containing predominantly hydrogen, methane and nitrogen and small amounts of helium and argon and is obtained from the recycle stream used in the production of ammonia.

15. The process of claim 10 wherein the helium gas concentration in said feed gas stream is increased by first passing said feed gas stream through membrane system to partially enrich the concentration of helium and then passing said partially enriched gas stream to said hydrogen separating material.

16. The process of claim 10 wherein the hydrogen separating material comprise at least two beds operated in a cyclic manor with a first bed operating in hydrogen uptake mode and a second bed simultaneously operating in a regeneration mode to produce said high purity hydrogen gas stream.

17. The process of claim 16 wherein the said first bed operates at a pressure equal to the said feed gas stream pressure minus the pressure drop needed to overcome the associated flow resistance.

18. The process of claim 16 wherein said second bed operates at a pressure in the range of near ambient pressure to 10 psig.

19. The process of claim 15 wherein said high purity hydrogen gas stream is recycled back to the ammonia production process.

20. The process of claim 10 wherein the flow rate of said hydrogen depleted gas stream is lower than the flow rate of said feed gas stream.

* * * * *